United States Patent
Paul

(10) Patent No.: US 9,565,973 B2
(45) Date of Patent: Feb. 14, 2017

(54) COOKING PAN ASSEMBLY

(71) Applicant: Tashee Paul, Oak Park, MI (US)

(72) Inventor: Tashee Paul, Oak Park, MI (US)

(*) Notice: Subject to any disclaimer, the term of this patent is extended or adjusted under 35 U.S.C. 154(b) by 0 days.

(21) Appl. No.: 14/712,946

(22) Filed: May 15, 2015

(65) Prior Publication Data

US 2016/0331183 A1 Nov. 17, 2016

(51) Int. Cl.
A47J 45/10 (2006.01)
A47J 45/07 (2006.01)

(52) U.S. Cl.
CPC .............. *A47J 45/071* (2013.01); *A47J 45/10* (2013.01)

(58) Field of Classification Search
CPC ........... A47J 45/071; A47J 45/10; A47J 45/07
USPC ......................................................... 220/759
See application file for complete search history.

(56) References Cited

U.S. PATENT DOCUMENTS

| | | | |
|---|---|---|---|
| 2,798,248 A * | 7/1957 | Sladky | A47J 45/071 220/776 |
| 3,203,029 A | 8/1965 | Serio | |
| 3,342,517 A | 9/1967 | Pryce | |
| 5,048,882 A * | 9/1991 | Fielding | A47J 37/0694 16/425 |
| 5,887,751 A | 3/1999 | Kroscher | |
| 6,250,493 B1 | 6/2001 | Kwan | |
| 6,393,973 B1 | 5/2002 | Velo et al. | |
| D682,018 S | 5/2013 | Zemel et al. | |
| 2005/0015933 A1 * | 1/2005 | Hasegawa | A47J 45/071 16/422 |
| 2012/0168455 A1 | 7/2012 | Doyle | |

FOREIGN PATENT DOCUMENTS

WO WO2009018689 12/2009

* cited by examiner

*Primary Examiner* — Stephen Castellano

(57) ABSTRACT

A cooking pan assembly includes a container for receiving food to be cooked. The container includes a bottom wall and a perimeter wall. The perimeter wall has an upper edge defining an opening into the container. A handle has a first end and a second end. A coupler releasably couples the first end to the perimeter wall adjacent to the upper edge. The coupler includes first mating member non-removably attached to the perimeter wall and a second mating member non-removably attached to the first end of the handle. The second mating member is releasably engaged to the first mating member.

2 Claims, 6 Drawing Sheets

COOKING PAN ASSEMBLY

BACKGROUND OF THE DISCLOSURE

Field of the Disclosure

The disclosure relates to cooking pan systems and more particularly pertains to a new cooking pan system for allowing easy removal of handles from a cooking pot or pan.

SUMMARY OF THE DISCLOSURE

An embodiment of the disclosure meets the needs presented above by generally comprises a container configured for receiving food to be cooked. The container includes a bottom wall and a perimeter wall. The perimeter wall has an upper edge defining an opening into the container. A handle has a first end and a second end. A coupler releasably couples the first end to the perimeter wall adjacent to the upper edge. The coupler includes first mating member non-removably attached to the perimeter wall and a second mating member non-removably attached to the first end of the handle. The second mating member is releasably engaged to the first mating member.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
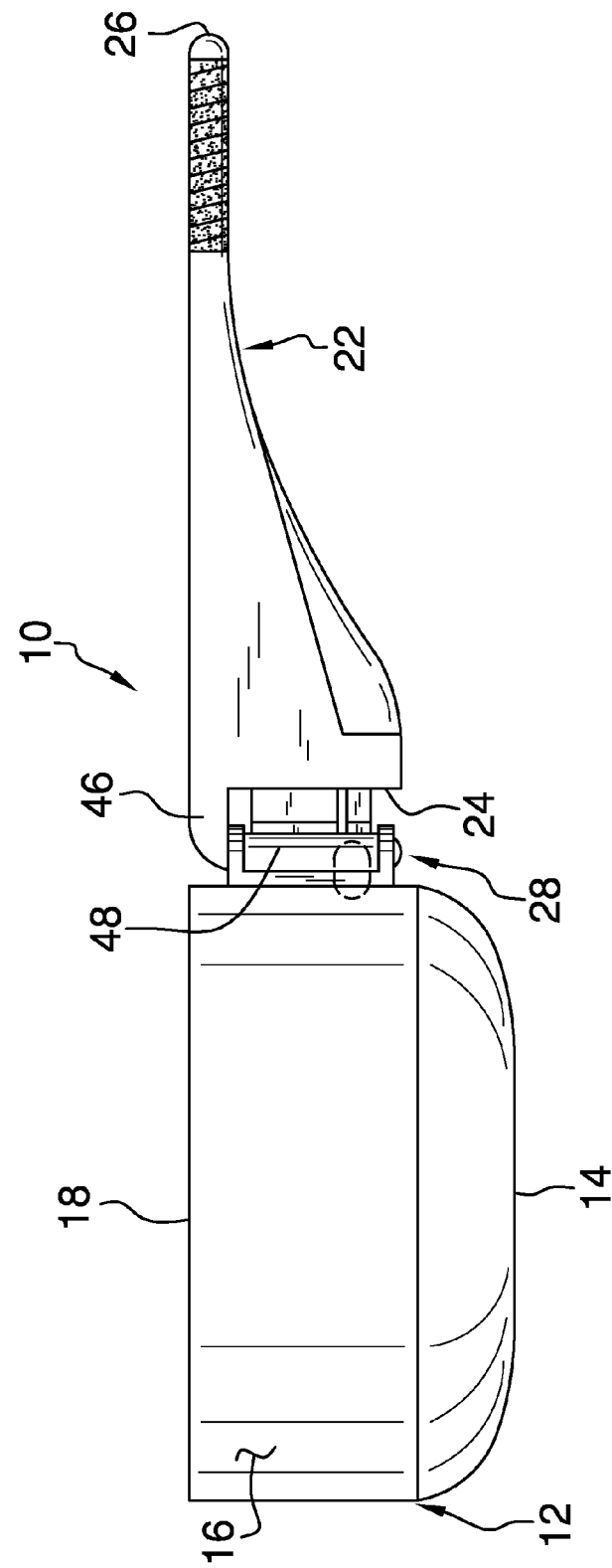
FIG. 1 is a side view of a cooking pan assembly according to an embodiment of the disclosure.
Figure 2:
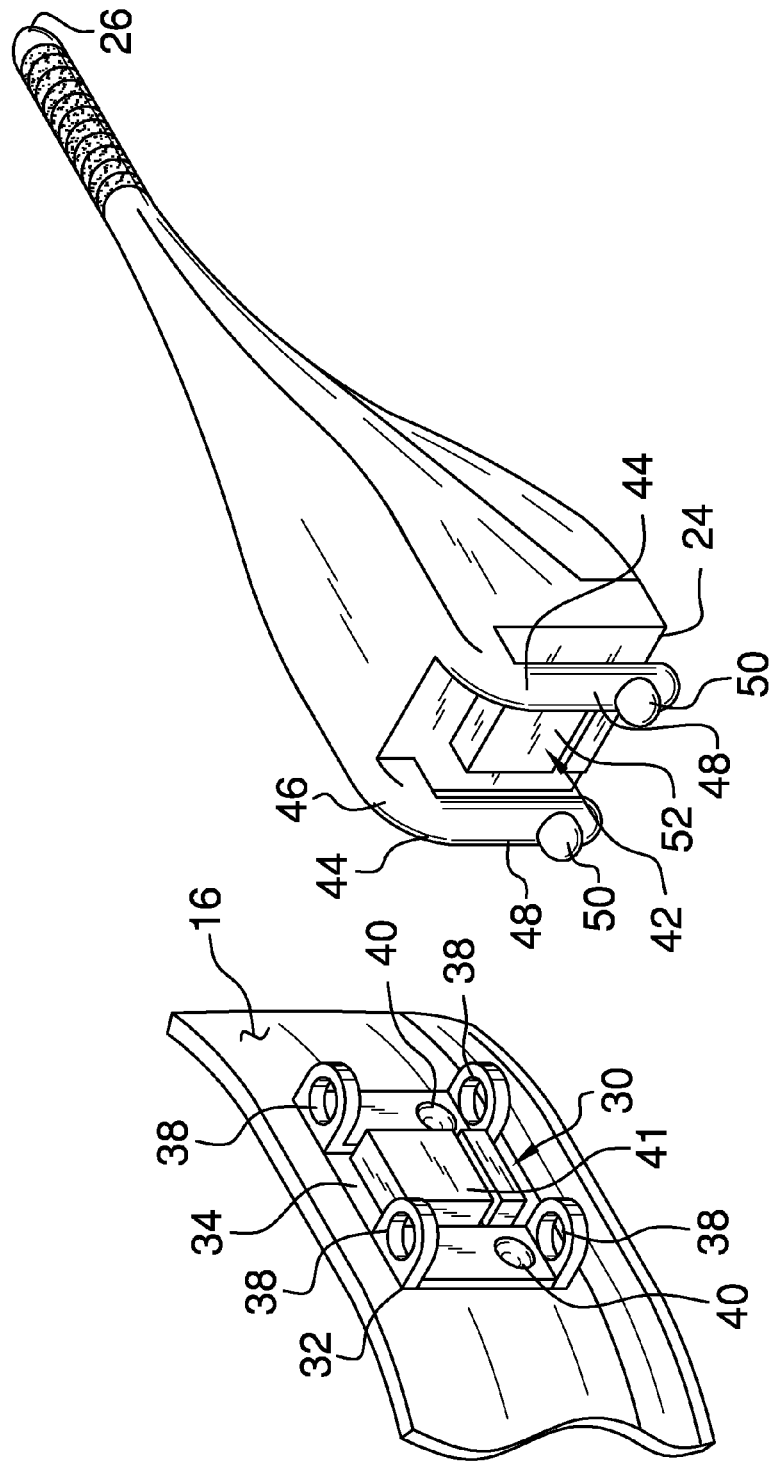
FIG. 2 is a perspective view of an embodiment of the disclosure.
Figure 3:
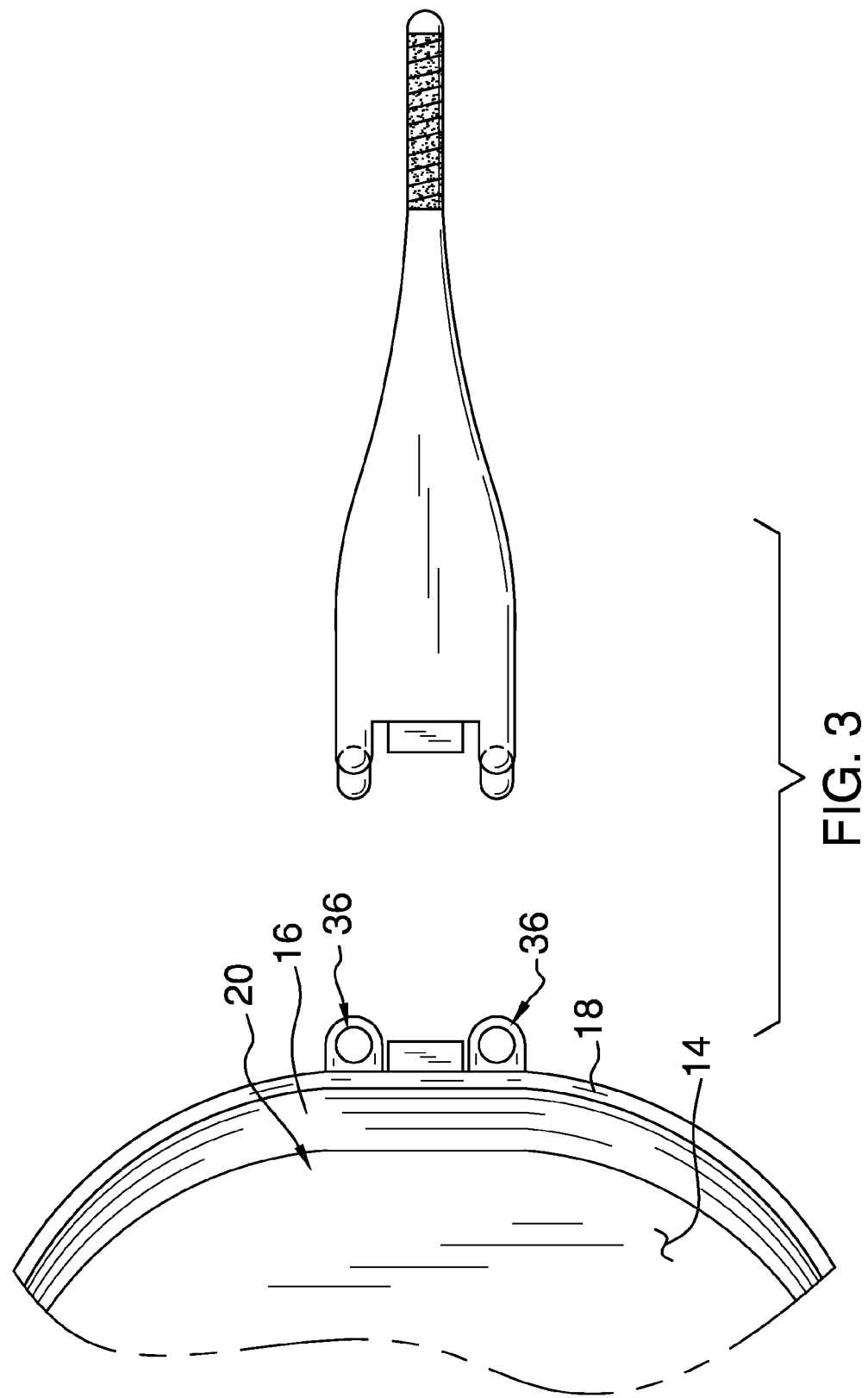
FIG. 3 is a bottom view of an embodiment of the disclosure.
Figure 4:
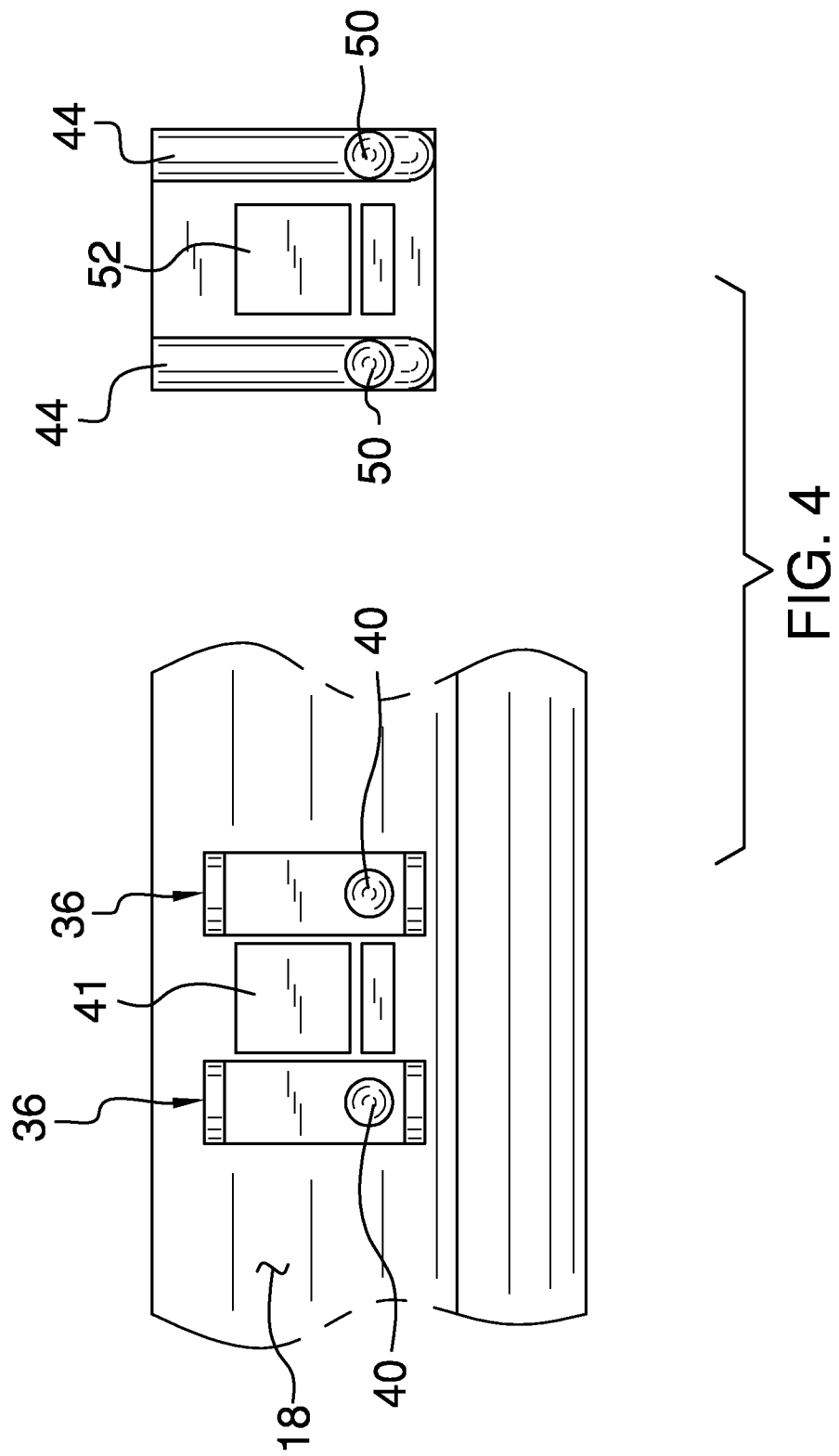
FIG. 4 is a front view of an embodiment of the disclosure.

With reference now to the drawings, and in particular to FIGS. 1 through 6 thereof, a new cooking pan system embodying the principles and concepts of an embodiment of the disclosure and generally designated by the reference numeral 10 will be described.

As best illustrated in FIGS. 1 through 6, the cooking pan assembly 10 generally comprises a container 12 configured for receiving food to be cooked. The container 12 includes a bottom wall 14 and a perimeter wall 16 and the perimeter wall 16 has an upper edge 18 defining an opening 20 into the container 12. The container 12 will typically be comprised of materials to allow to be used over heat such as for frying, boiling and other conventional cooking techniques and therefore may be considered a conventional frying pan, cooking pot or the like.

Figure 6:
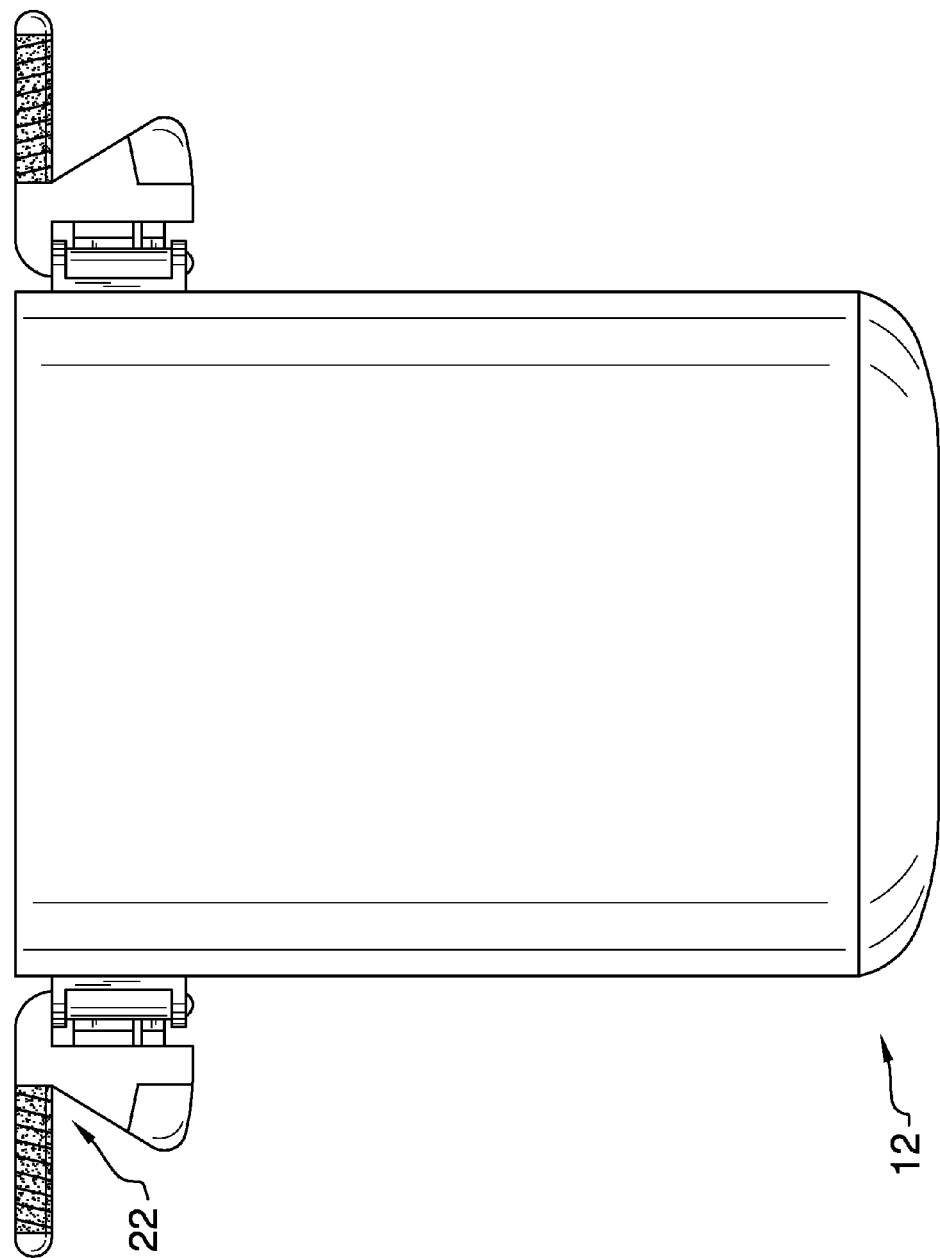
FIG. 6 is a side view of an embodiment of the disclosure.

A handle 22 is provided that has a first end 24 and a second end 26. FIG. 6 shows an embodiment of handle 22 having a differing shape than that shown in FIG. 1.

A coupler 28 releasably couples the first end 24 to the perimeter wall 16 adjacent to the upper edge 18. The coupler 28 includes a first mating member 30 that is non-removably attached to the perimeter wall 16. The first mating member 30 includes a bracket 32 including a base plate 34 and a pair of receivers 36 that are attached to base plate 34 and are laterally spaced from each other. Each of the receivers 36 includes a pair of loops 38 vertically spaced from each other. The base plate 34 has a pair of indents 40. Each of the indents 40 is positioned between an associated pair of the loops 38. A first panel 42 is attached to the base plate 34 and is positioned between the receivers 36.

Figure 5:
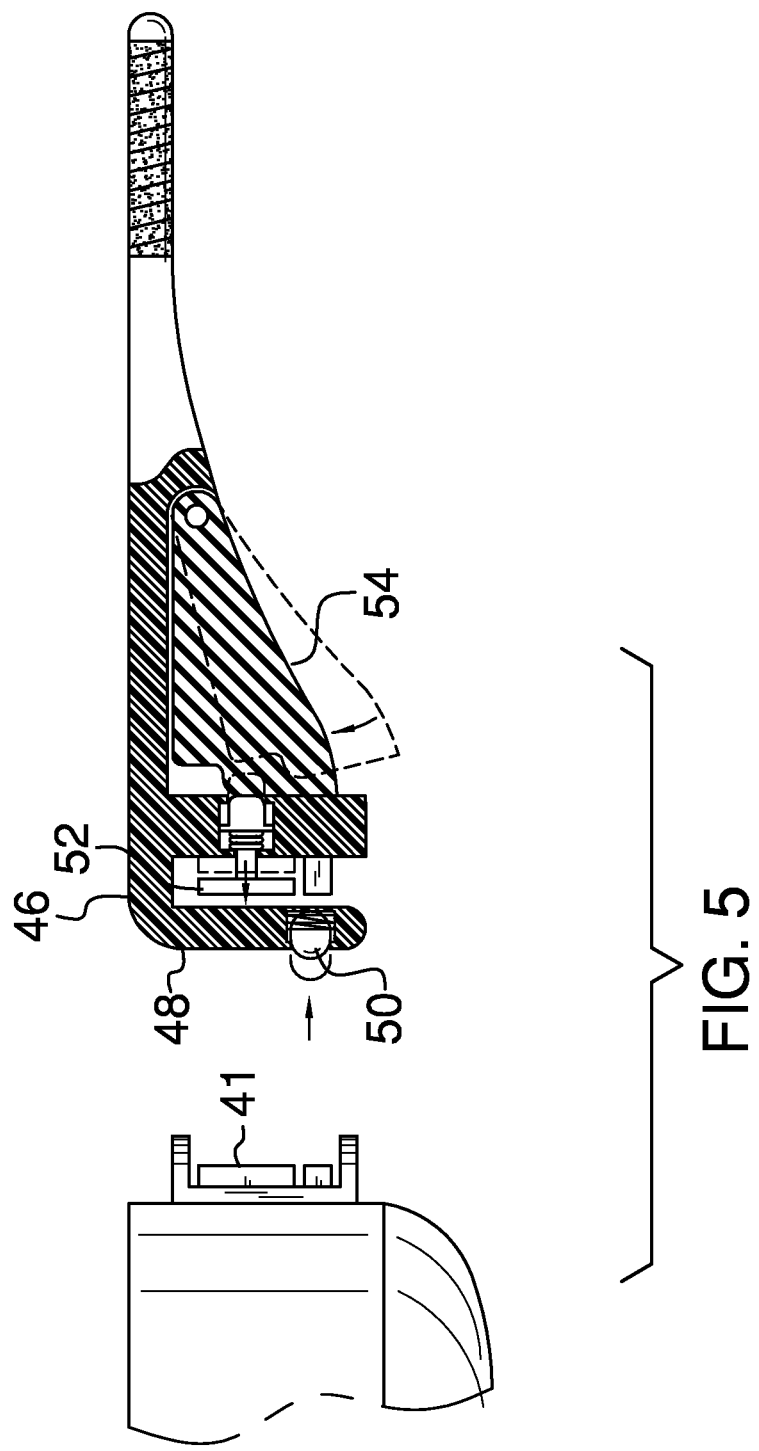
FIG. 5 is a side broken view of an embodiment of the disclosure.

The coupler 28 further includes a second mating member 42 that is non-removably attached to the first end 24 of the handle 22. The second mating member 42 is releasably engaged to the first mating member 30. The second mating member 42 includes a pair of prongs 44 each removably engaged with one of the receivers 36. Each of the prongs 44 include a first portion 46 and a second portion 48 oriented perpendicular to each other. Each of the first portions 46 is attached to the first end 24 and each of the second portions 48 extends downwardly from an associated one of the first portions 46. Each of the second portions 48 is extendable through the loops 38 of one of the receivers 36. The prongs 44 each include an outwardly biased detent 50, wherein each of the detents 50 is removably extended into one of the indents 40. A second panel 52 is attached to the first end 24 and is magnetically attracted to the first panel 41. As shown in FIG. 5, the second panel 52 may be movable with a conventional actuator 54 away from the first panel 41 to facilitate removal of the second mating member 42 from the first mating member 30.

In use, a plurality of containers 12 and sets of handles 22 may be provided which are interchangeable with each other. Moreover, the handles 22 may be removed when not needed for manipulating the container 12. This may be useful for preventing the handles 22 from becoming hot during cooking and may also prevent accidental hitting or gripping by a child who may be positioned adjacent to a stove having the container 12 positioned thereon. Further, the removability of the handle 22 will additionally facilitate the cleaning of the container 12 to allow it to fit more readily in a sink or dishwasher.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cooking pan assembly comprising:
  a container configured for receiving food to be cooked, said container including a bottom wall and a perimeter wall, said perimeter wall having an upper edge defining an opening into said container;
  a handle having a first end and a second end;
  a coupler releasably coupling said first end to said perimeter wall adjacent to said upper edge, said coupler including:
    a first mating member being non-removably attached to said perimeter wall, said first mating member including a bracket including a base plate, said first mating member including a pair of receivers being attached to said base plate and being laterally spaced from each other; and
    a second mating member being non-removably attached to said first end of said handle, said second mating member being releasably engaged to said first mating member, said second mating member including a pair of prongs, each of said prongs being removably engaged with one of said receivers;
  wherein each of said receivers includes a pair of loops vertically spaced from each other, each of said prongs including a first portion and a second portion oriented perpendicular to each other, each of said first portions being attached to said first end, each of said second portions extending downwardly from an associated one of said first portions, each of said second portions being extendable through said loops of one of said receivers; and
  wherein said base plate has a pair of indents, each of said indents being positioned between an associated pair of said loops, each of said prongs including an outwardly biased detent, each of said detents being removably extended into one of said indents.

2. A cooking pan assembly comprising:
  a container configured for receiving food to be cooked, said container including a bottom wall and a perimeter wall, said perimeter wall having an upper edge defining an opening into said container;
  a handle having a first end and a second end;
  a coupler releasably coupling said first end to said perimeter wall adjacent to said upper edge, said coupler including:
    a first mating member being non-removably attached to said perimeter wall, said first mating member including:
      a bracket including a base plate;
      a pair of receivers being attached to base plate and being laterally spaced from each other, each of said receivers including a pair of loops vertically spaced from each other, said base plate having a pair of indents, each of said indents being positioned between an associated pair of said loops;
      a first panel being attached to said base plate, said first panel being positioned between said receivers;
    a second mating member being non-removably attached to said first end of said handle, said second mating member being releasably engaged to said first mating member, said second mating member including:
      a pair of prongs, each of said prongs being removably engaged with one of said receivers, each of said prongs including a first portion and a second portion oriented perpendicular to each other, each of said first portions being attached to said first end, each of said second portions extending downwardly from an associated one of said first portions, each of said second portions being extendable through said loops of one of said receivers, each of said prongs including an outwardly biased detent, each of said detents being removably extended into one of said indents; and
      a second panel being attached to said first end, said second panel being magnetically attracted to said first panel.

* * * * *